(12) United States Patent
Bobroff et al.

(10) Patent No.: US 11,537,932 B2
(45) Date of Patent: Dec. 27, 2022

(54) GUIDING MACHINE LEARNING MODELS AND RELATED COMPONENTS

(71) Applicant: International Business Machines Corporation, Armonk, NY (US)

(72) Inventors: Norman Bobroff, Katonah, NY (US); Alan Braz, Bedford Hills, NY (US); Martin Hirzel, Ossining, NY (US); Todd Mummert, Danbury, CT (US); Peter Westerink, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1079 days.

(21) Appl. No.: 15/840,315

(22) Filed: Dec. 13, 2017

(65) Prior Publication Data
US 2019/0180199 A1   Jun. 13, 2019

(51) Int. Cl.
*G06N 20/00* (2019.01)
*G06N 5/04* (2006.01)

(52) U.S. Cl.
CPC .............. *G06N 20/00* (2019.01); *G06N 5/04* (2013.01)

(58) Field of Classification Search
CPC ...... G06N 20/00; G06N 20/20; G06N 3/0454; G06N 5/04
See application file for complete search history.

(56) References Cited

U.S. PATENT DOCUMENTS

| | | | |
|---|---|---|---|
| 8,311,967 B1 * | 11/2012 | Lin | G06N 20/00 706/45 |
| 2010/0241596 A1 * | 9/2010 | Lee | G06N 5/04 706/11 |
| 2013/0035908 A1 | 2/2013 | Ivrii | |
| 2014/0172773 A1 | 6/2014 | Schmidt | |
| 2016/0110657 A1 * | 4/2016 | Gibiansky | G06N 20/00 706/12 |
| 2016/0132787 A1 | 5/2016 | Drevo | |

(Continued)

FOREIGN PATENT DOCUMENTS

| | | |
|---|---|---|
| WO | 2008142675 | 11/2008 |
| WO | 2014078848 | 5/2014 |
| WO | 2015042536 | 3/2015 |

OTHER PUBLICATIONS

Lysiak et al., "Optimal selection of ensemble classifiers using measures of competence and diversity of base classifiers", Feb. 27, 2014, Neurocomputing, vol. 126, , pp. 29-35 (Year: 2014).*

(Continued)

*Primary Examiner* — Brent Johnston Hoover
(74) *Attorney, Agent, or Firm* — Amin, Turocy & Watson, LLP

(57) ABSTRACT

Techniques facilitating guiding machine learning models and related components are provided. In one example, a computer-implemented method comprises identifying, by a device operatively coupled to a processor, a set of models, wherein the set of models includes respective model components; determining, by the device, one or more model relations among the respective model components, wherein the one or more model relations respectively comprise a vector of component relations between respective pairwise ones of the model components; and suggesting, by the device, a subset of the set of models based on a mapping of the component relations.

25 Claims, 16 Drawing Sheets

(56) References Cited

U.S. PATENT DOCUMENTS

2016/0300156 A1 10/2016 Bowers
2018/0285764 A1* 10/2018 Hu .......................... H04L 67/10

OTHER PUBLICATIONS

Giacinto et al., "Design of Effective Multiple Classifier Systems by Clustering of Classifiers", Sep. 7, 2000, Proceedings 15th International Conference on Pattern Recognition. ICPR-2000, pp. 160-163 (Year: 2000).*
Ozertem et al., "Learning to Suggest: A Machine Learning Framework for Ranking Query Suggestions", Aug. 16, 2012, SIGIR'12, pp. 25-34. (Year: 2012).*
Ali, et al., Accurate Multi-Criteria Decision Making Methodology for Recommending Machine Learning Algorithm, Expert Systems with Applications, Apr. 1, 2017, p. 257-278, vol. 71.
International Search Report and Written Opinion for International Application Serial No. PCT/IB2018/059928 dated Apr. 10, 2019, 9 pages.
Notice of Reasons for Refusal for Japanese Patent Application No. 2020-529726, dated Jun. 17, 2022.

* cited by examiner

GUIDING MACHINE LEARNING MODELS AND RELATED COMPONENTS

TECHNICAL FIELD

The subject disclosure relates to computing systems, and more specifically, to techniques facilitating computer-assisted data science applications.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate recommendation and/or suggestion of machine learning models and their related components are described.

According to an embodiment, a system can include a memory that stores computer executable components and a processor that executes computer executable components stored in the memory. The computer executable components can include an identification component that identifies a set of models, where the set of models includes respective model components, a determination component that determines one or more model relations among the respective model components, where the one or more model relations respectively include a vector of component relations between respective pairwise ones of the model components, and a suggestion component that suggests a subset of the set of models based on a mapping of the component relations.

According to another embodiment, a computer-implemented method can include identifying, by a device operatively coupled to a processor, a set of models, where the set of models includes respective model components; determining, by the device, one or more model relations among the respective model components, where the one or more model relations respectively comprise a vector of component relations between respective pairwise ones of the model components; and suggesting, by the device, a subset of the set of models based on a mapping of the component relations.

According to a further embodiment, a computer program product for providing guidance in machine learning models can include a computer readable storage medium having program instructions embodied therewith. The program instructions can be executable by a processing component to cause the processing component to identify a set of models, where the set of models includes respective model components, determine one or more model relations among the respective model components, where the one or more model relations respectively comprise a vector of component relations between respective pairwise ones of the model components, and suggest a subset of the set of models based on a mapping of the component relations.

According to an additional embodiment, a system can include a memory that stores computer executable components and a processor that executes computer executable components stored in the memory. The computer executable components can include an identification component that identifies a set of models, where the set of models includes respective first model components, an intake component that identifies an incoming machine learning model, where the incoming machine learning model includes respective second model components, and an annotation component that annotates the incoming machine learning model with respective estimated pairwise distances between respective ones of the first model components and corresponding ones of the second model components.

According to still another embodiment, a computer-implemented method can include identifying, by a device operatively coupled to a processor, a set of models, where the set of models includes respective first model components; identifying, by the device, an incoming machine learning model, where the incoming machine learning model includes respective second model components; and annotating, by the device, the incoming machine learning model with respective estimated pairwise distances between respective ones of the first model components and corresponding ones of the second model components.

DETAILED DESCRIPTION

Figure 1:
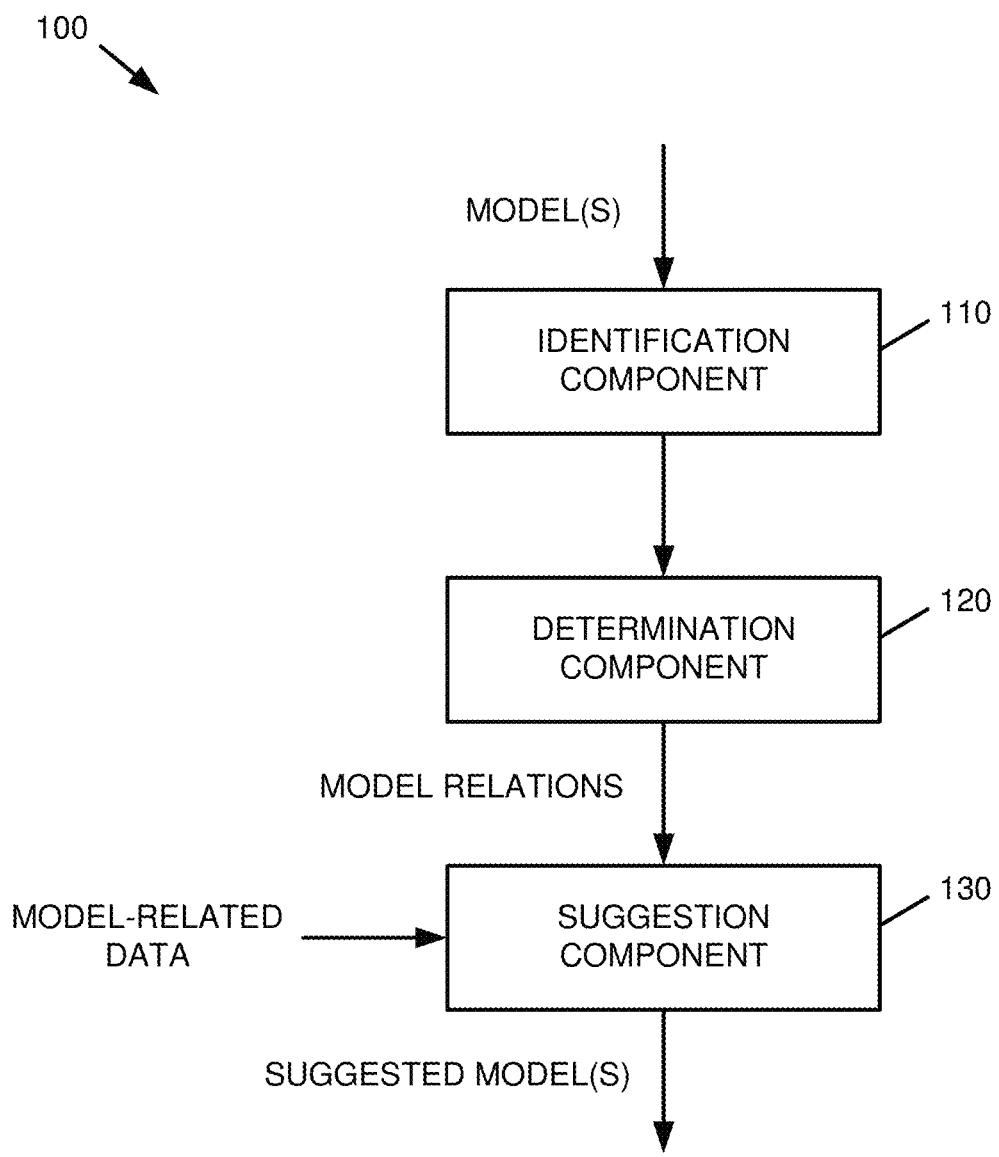
FIG. 1 is a block diagram of a system that facilitates guiding machine learning models and related components according to one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Advancements in computing technology have led to improvements in the ability of computers to store, manage, and utilize large sets of data. These advancements and the emergence of new fields of study such as data science are leading to new insights into the world we live in, which is resulting in improvements in a wide variety of scientific and technological areas.

The computer-assisted nature of modern data science applications, as well as the sheer scope of data that such applications can store and utilize, present unique challenges to data scientists as a direct result of the introduction of computerization. For instance, a data scientist working on a new project often starts the project from scratch, e.g., without existing models, frameworks, or data, due to difficulties in identifying and/or locating other previously prepared models, frameworks, and/or data that could be useful to the current project. These difficulties can result in duplicated work and/or other factors that can reduce the efficiency of a given project.

Further, a large amount of model versions, data, and/or other information can be generated during experimentation and/or other work on a given project. Because the amount of data produced in connection with a project can be beyond that which can be processed by a human in a useful or reasonable timeframe, it is desirable to provide guidance to a data scientist and/or other user over the course of a project regarding steps that have been taken, models that have been deployed, etc., in a focused and useful manner By way of example, to improve the functionality of models in a data science application, it can be desirable for a data scientist to leverage prior experience to implement changes that were previously implemented in other applications to achieve a desired result. However, due to the scale of data that is generated in a normal data science application, manual recall of such changes can be difficult and/or otherwise infeasible. Moreover, a given data scientist can only leverage his or her own experience, as he or she may not have knowledge of actions performed by others on the same or similar projects.

To the foregoing and related ends, various embodiments described herein can leverage machine learning models and related data sets to provide guidance to a user relating to selection of models, and/or various components of a model, for use in a data science application and/or other application for which use of a machine learning model is desirable. Various embodiments described herein further aid in the process of improving a model by recognizing and leveraging patterns in the data, actions, experimental results, or the like, of a given user or other users. As further described herein, systems and/or methods can be employed to enable exploration of large amounts of models and/or model versions. For instance, a cognitive exploration system can be employed that can learn over time how to compare models and how to provide suggestions and/or other guidance to a user. Other embodiments as described below can also be used.

With reference to the drawings, FIG. 1 illustrates a block diagram of a system 100 that facilitates guiding machine learning models and related components according to one or more embodiments described herein. Repetitive description of like elements employed in other embodiments described herein is omitted for sake of brevity. As shown in FIG. 1, the system 100 includes an identification component 110 that can identify a set of models, such as machine learning models, neural networks, and/or any other model of any other suitable structure either presently known or developed in the future. The respective models in the set of models utilized by the identification component 110 can, in turn, include respective model components. In an aspect, the system 100 can utilize a comprehensive definition of a model that encompasses any available information that can be associated with the model as components of the model.

By way of specific, non-limiting example, model components that can be identified by the identification component 110 can include, but are not limited to, data used to train the model, experimental data with which the model is associated, model configurations and/or a history of such configurations, parameters and/or hyper-parameters of the model, program code utilized to implement the model on a computing device, base and/or parent models from which the model was derived, model performance metrics, deployment metrics or other deployment data, model feedback (e.g., user feedback given in response to a deployment of the model, etc.), and/or any other suitable information. These and/or other model components are described in further detail with respect to FIG. 2 below.

The system 100 shown by FIG. 1 further includes a determination component 120 that can determine one or more model relations among the respective model components as identified by the identification component 110. In an aspect, the determination component 120 can compare pairs of models identified by the identification component 110 and their respective components, and the resulting model relations determined by the determination component 120 can include a vector of component relations between respective pairwise ones of the compared model components. Examples of techniques that can be utilized by the determination component 120 to determine model relations are described in further detail below with respect to FIGS. 3-4.

As additionally shown by FIG. 1, the system 100 further includes a suggestion component 130 that suggests a subset of the set of models identified by the identification component 110 based on a mapping of the component relations as determined by the determination component 120. In an aspect, suggestion of a model as performed by the suggestion component 130 can be performed in response to providing model-related data to the suggestion component 130, e.g., in the form of a request or query. For instance, one or more components of a model can be provided as input to the suggestion component 130, in response to which the suggestion component 130 can suggest models having model components that are similar to the provided model components. In another example, a data set can be provided to the suggestion component 130, in response to which the suggestion component 130 can suggest one or more models that have been associated with similar data sets. Other model-related data could also be provided to the suggestion component 130, in response to which the suggestion component 130 can provide suggestions in a similar manner.

Figure 2:
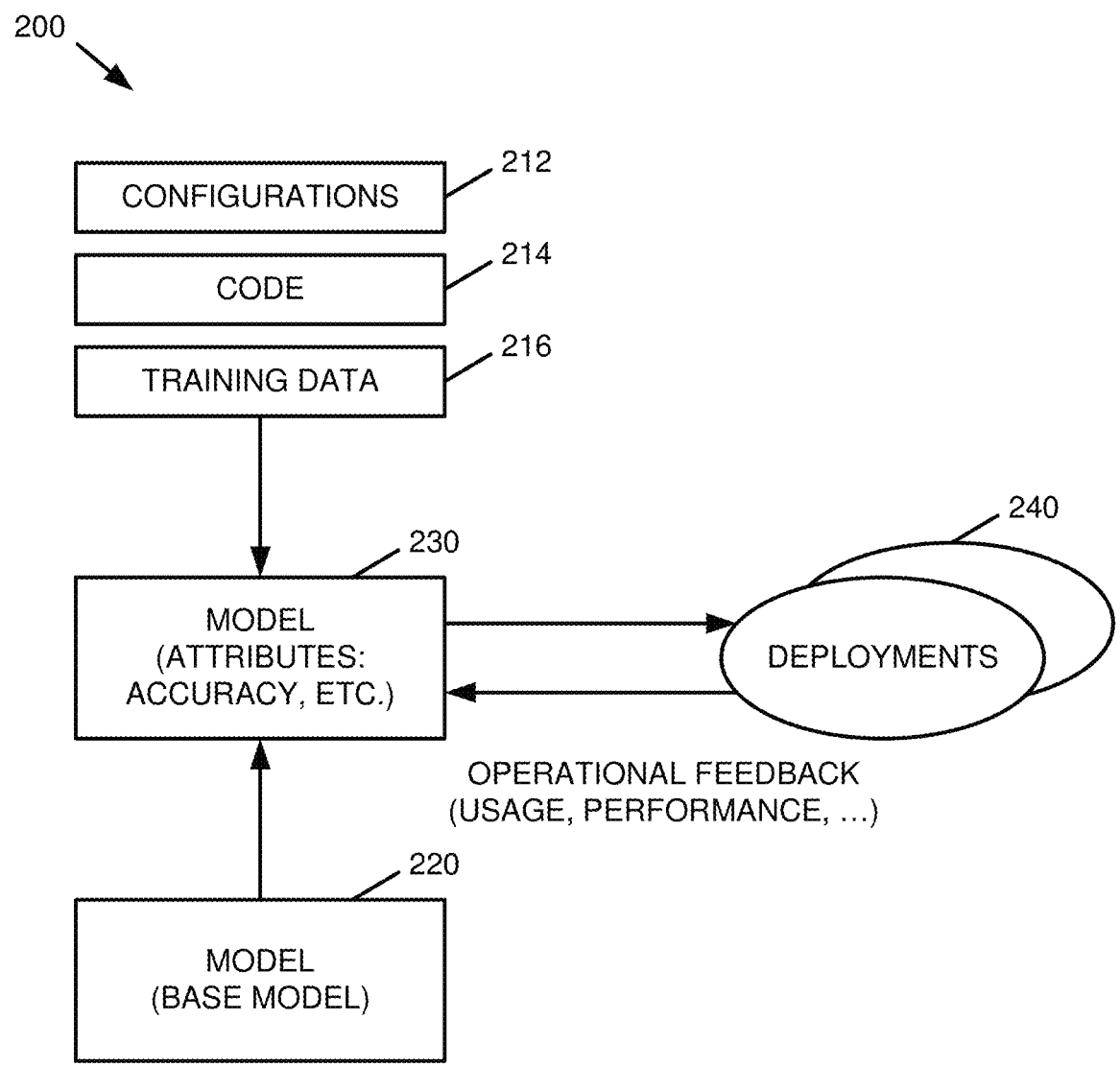
FIG. 2 is a diagram depicting example, non-limiting model components that can be utilized by one or more embodiments described herein.

Diagram 200 in FIG. 2 illustrates example, non-limiting model components that can be utilized by one or more embodiments described herein. It should be appreciated, however, that the model components shown in diagram 200 are merely some of the model components that can be utilized and that other model components in addition to, or in place of, those shown in diagram 200 could also be used.

As shown by diagram 200, example model components can include configurations 212 associated with the model. In some cases a model can be associated with multiple distinct configurations 212. For instance, if the configuration of a given model changes over time, the configurations 212 can include these changes as well as other information, such as the time(s) the changes were made. As further shown in diagram 200, the properties of a model can include computer program code 214 used to implement the model. The computer program code 214 can be created in any suitable programming language or combination of programming languages, and can include the full code used to implement the model and/or portions of the code.

As additionally shown by diagram 200, properties of a model can include training data 216 associated with the model. In an aspect, the training data 216 provided as a model component for a given model can include at least a portion of the complete lifecycle for the training data 216 used to train the model. In another aspect, training data 216 can include the data themselves as well as a description of the data and/or what the data represents, e.g., audio samples, text inputs, spectral signatures, or the like.

In an aspect, the model components for a given model can further include an identity of a base (parent) model 220 from which the model is derived. For instance, a machine learning model trained to operate on a given type of data can be used as the base model for another machine learning model to be trained to operate on a similar type of data through techniques such as transfer learning. Other techniques for deriving a new model from a base model 220 could also be used.

As further shown by diagram 200, the model components can include respective attributes 230 of the model. The attributes 230 of the model can include one or more algorithmic parameters of the model, such as the type of model used, node and/or layer configurations used for a neural network, or the like. Also or alternatively, the attributes 230 of the model can include an expected or estimated accuracy of the model, classifications and/or other outputs that can be generated by the model in response to input data, etc.

The model components shown in diagram 200 can further include deployment data 240 associated with one or more deployments of the model. The deployment data 240 can include, e.g., times and dates of deployment and/or frequency of use, performance metrics associated with a deployed model (e.g., in terms of accuracy, a confusion matrix, and/or other criteria), other information related to the results of a deployed model, input data used in connection with a deployed model, feedback from model deployments, or the like.

In an aspect, the model components shown in diagram 200, and/or other suitable components, can be obtained from directly provided information, e.g., information provided by a data scientist and/or other user to the identification component 110. Also or alternatively, data relating to model components can be generated automatically as experiments and/or other trials are performed using a model, e.g., via data mining or other operations. Together, the model components shown in diagram 200 and/or other suitable components can operate as a meta-model, e.g., a model of a given model, for further operations as performed by the embodiments described herein.

Figure 3:
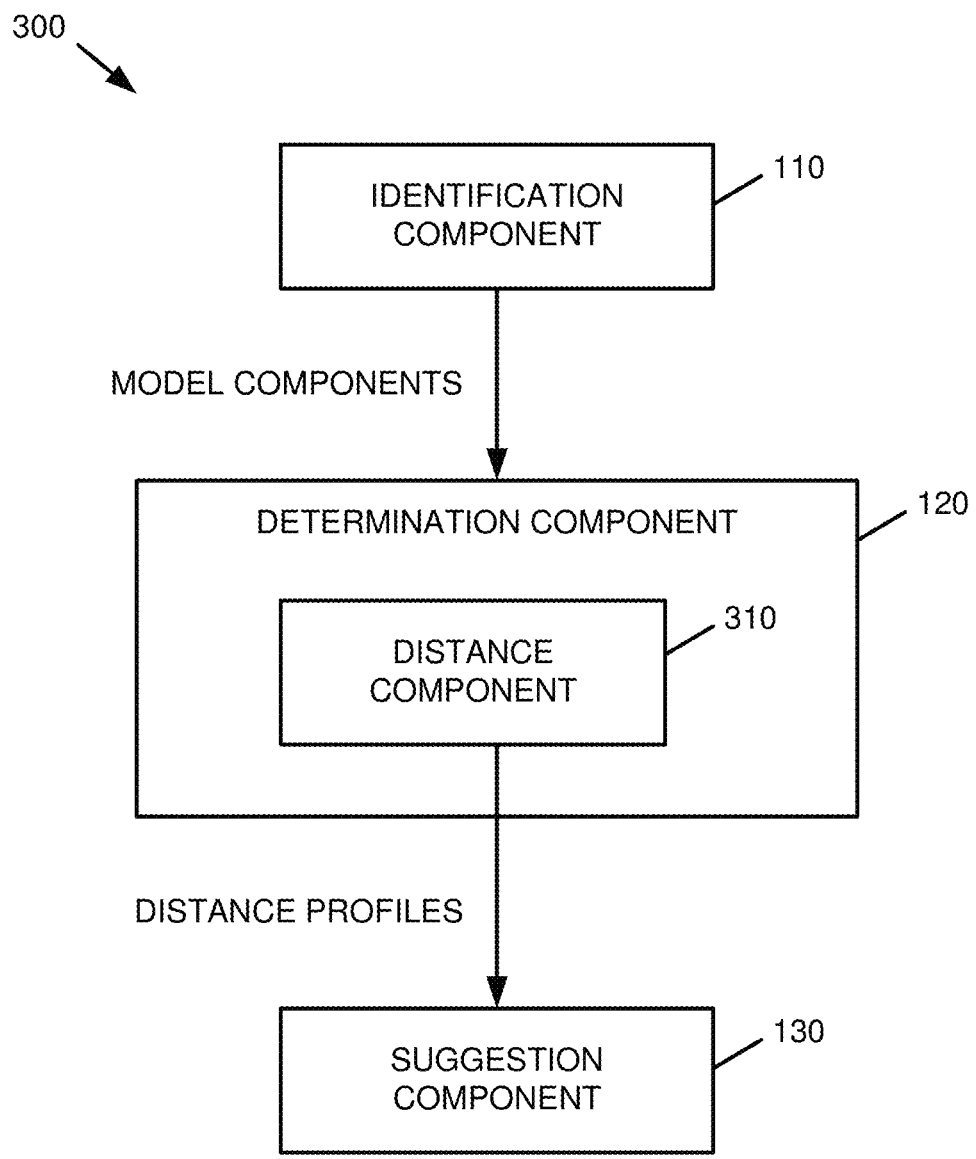
FIG. 3 is a block diagram of a system that facilitates generation of distance profiles based on model component relations according to one or more embodiments described herein.

Turning to FIG. 3, a system 300 that facilitates generation of distance profiles based on model component relations according to one or more embodiments described herein is illustrated. Repetitive description of like elements employed in other embodiments described herein is omitted for sake of brevity. As shown in FIG. 3, system 300 includes an identification component 110, a determination component 120, and a suggestion component 130 that can function as generally described above with respect to FIG. 1. In an aspect, system 300 further includes a distance component 310 that can assist the determination component 120 in determining model relations by computing one or more distances between the pairwise ones of the model components corresponding to at least two of a set of models provided by the identification component 110. While the distance component 310 is illustrated in FIG. 3 as part of the determination component 120, it should be appreciated that the distance component 310 can in some embodiments operate separately from the determination component 120.

In an aspect, the distance component 310 facilitates a model definition that identifies the components of a model and further defines distances between pairwise components of different models. This model definition, in turn, facilitates the processing of respective models as a multi-layer complete graph that can be used for model guidance and/or exploration.

Figure 4:
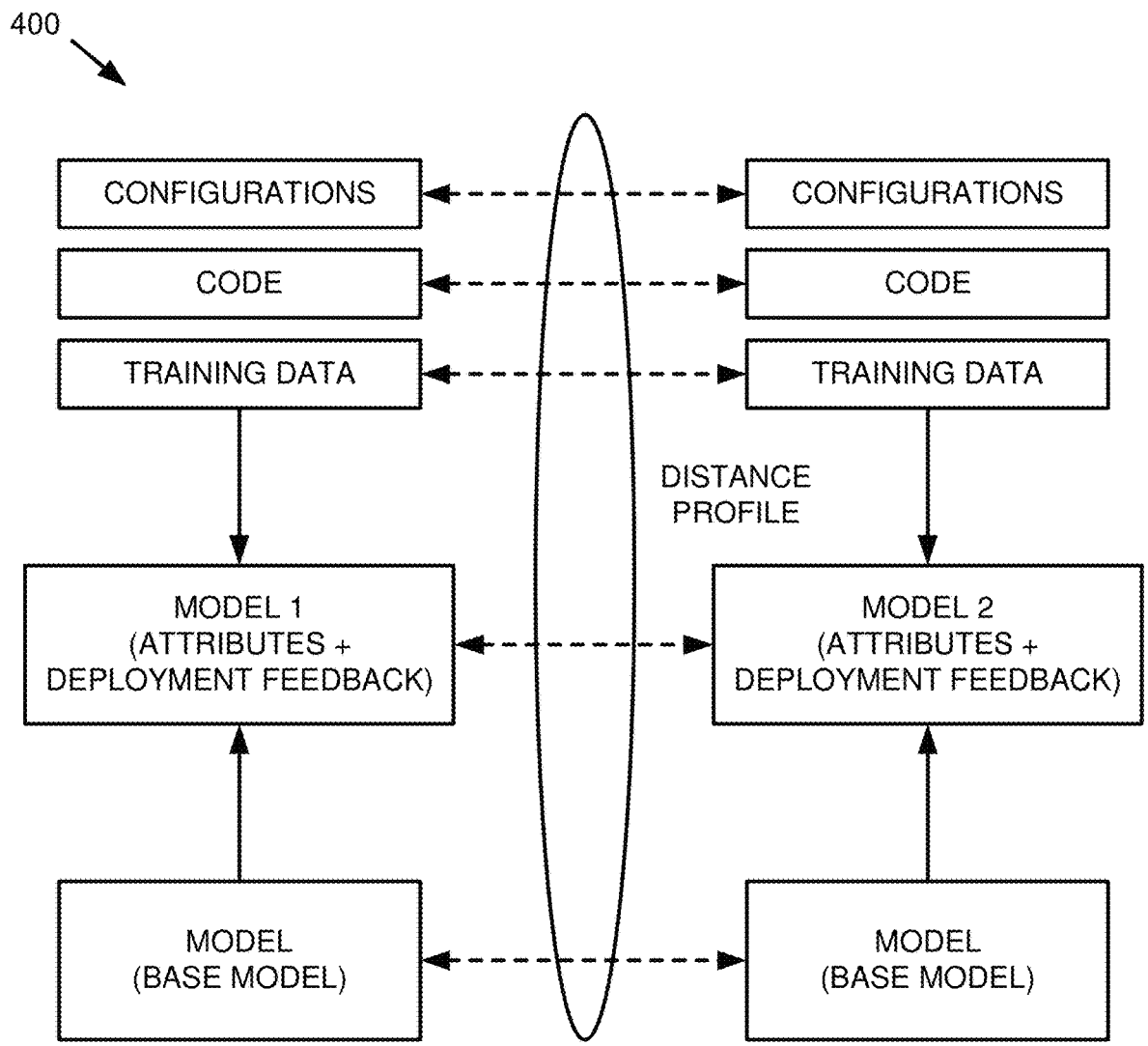
FIG. 4 is a diagram depicting an example, non-limiting distance profile that can be utilized by one or more embodiments described herein.

Diagram 400 in FIG. 4 illustrates non-limiting example distance measures that can be performed by the distance component 310. As shown in diagram 400, a pair of models can be identified that have model components (e.g., configurations, code, training data, base model, model attributes, etc.) that are similar to those described above with respect to FIG. 2. In an aspect, the distance component 310 can perform pairwise comparisons on respectively corresponding model components of the pair of models, as illustrated in diagram 400 via dashed lines. Respective ones of the comparisons performed by the distance component 310 can be compiled into a distance profile. The distance profile can be of any suitable structure, such as a vector of distances corresponding to the respective pairwise model components, and/or any other suitable structure.

In an aspect, the distance component 310 can utilize multiple techniques for measuring or estimating similarity between model components, and different model components can be compared in different ways. By way of example, the distance component 310 can identify a classification performed by respective models (e.g., food recognition, speech recognition, etc.), and compute a degree of similarity between classifications of a pair of models. As another example, the distance component 310 can compute a degree of similarity between model implementations, such as neural network layers and/or nodes or model parameter settings. As a further example, the distance component 310 can compute a degree of similarity between program code associated with respective models, e.g., based on a plaintext comparison of the program code itself and/or by analyzing the functionality of the program code. As still another example, training data utilized by different models can be compared by the distance component 310, either directly or indirectly (e.g., based on probability density functions associated with the training data, etc.). Other comparisons are also possible.

As a result of the operations performed by the distance component 310, a distance profile indicative of the similarity between a pair of models can be generated. In an aspect, one or more distances computed by the distance component 310 corresponding to respective distance profiles can be utilized by the suggestion component 130 as a basis for suggesting a subset of a given set of models. In some cases, the suggestion component 130 can suggest a subset of a given set of models based on a comparison of one or more distances computed by the distance component 310 to a tolerance parameter. For instance, models that pertain to safety (e.g., a model that predicts automotive brake effectiveness), finance (e.g., a model that predicts movements in the stock market), and/or other similar areas can be configured with a low tolerance parameter, such that models in these areas can be suggested by the suggestion component 130 only if they exhibit a high degree of accuracy to provided model-related data. Conversely, areas in which efficient experimentation is more desirable as compared to accuracy can be configured with a higher tolerance parameter such that models can be suggested by the suggestion component 130 that exhibit less similarity to the provided model-related data.

Figure 5:
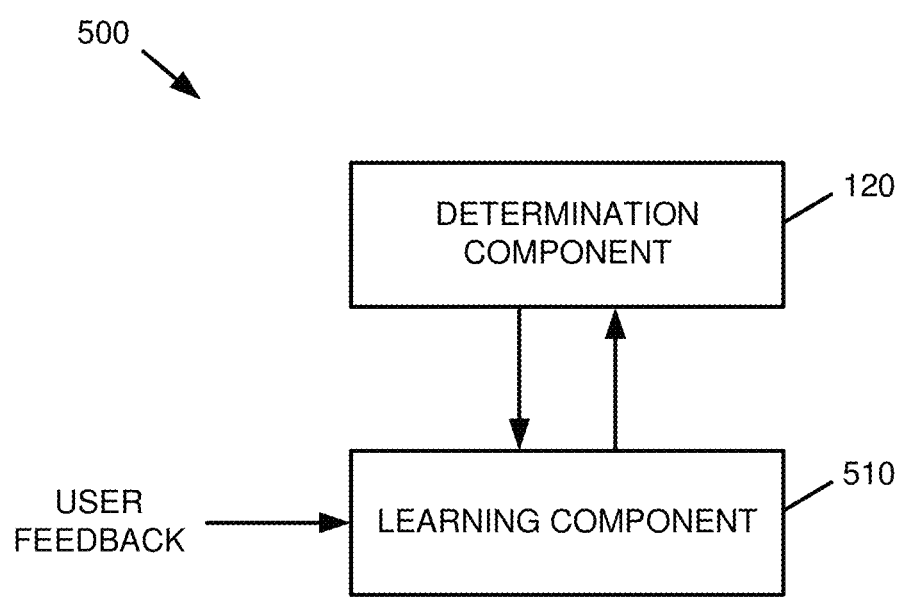
FIG. 5 is a block diagram of a system that facilitates refinement of machine learning model suggestions according to one or more embodiments described herein.

Referring next FIG. 5, a system 500 that facilitates refinement of machine learning model suggestions according to one or more embodiments described herein is illustrated. Repetitive description of like elements employed in other embodiments described herein is omitted for sake of brevity. As shown in FIG. 5, the system 500 includes a determination component 120 that computes relations between respective models and their corresponding model components as generally described above. The system 500 further includes a learning component 510 that updates one or more model relations as computed by the determination component 120 based on user feedback and/or other suitable information.

In an aspect, feedback can be provided to the learning component 510 either directly or indirectly. By way of specific, non-limiting example, a user can provide a request for guidance in selecting a model, in response to which a model can be suggested, e.g., by the suggestion component 130 as described above. The user can then provide feedback in response to the provided suggestion, e.g., at the time the suggestion is made and/or in connection with deployment of a model in accordance with the suggestion. Based on this feedback, the learning component can refine distances and/or other model relations as determined by the determination component 120, thereby learning over time how to implement a cognitive system for comparing models and suggesting and/or exploring an associated set of models and model components.

Figure 6:
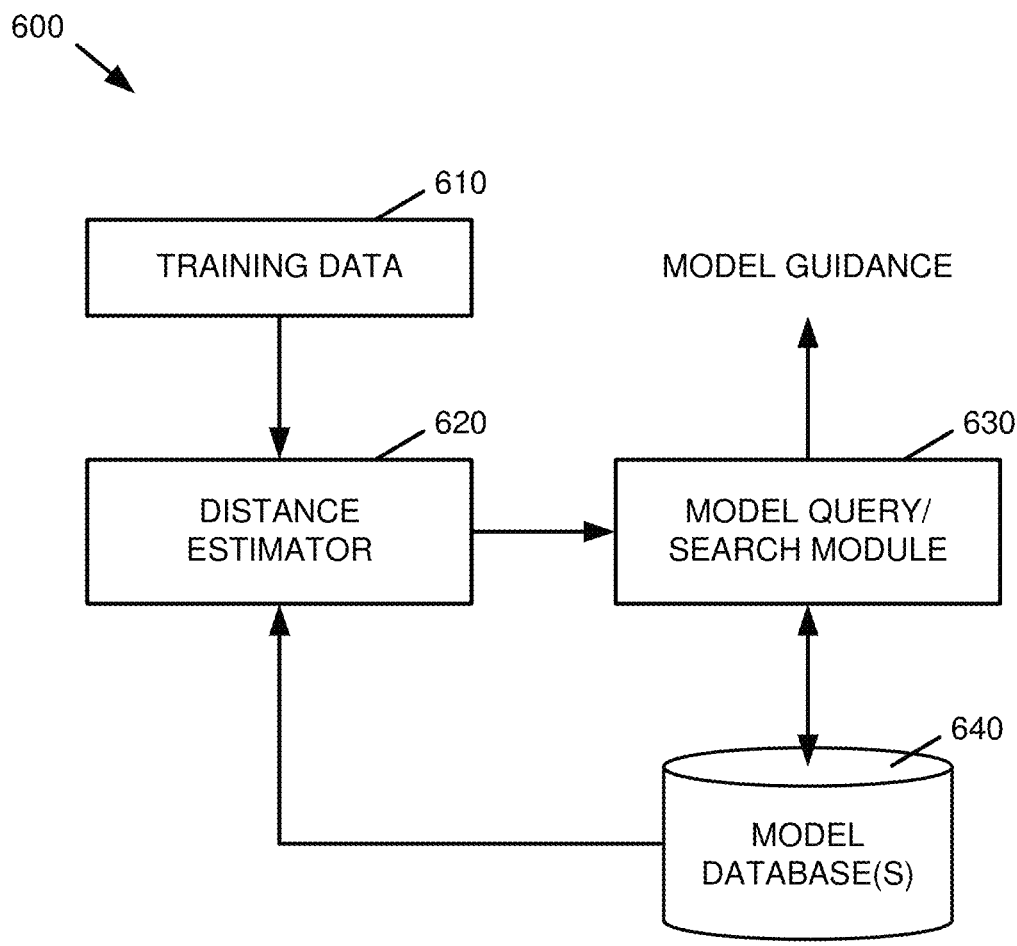
FIG. 6 is a block diagram of a system for suggesting machine learning models based on training data according to one or more embodiments described herein.

FIG. 6 illustrates a block diagram of a system 600 for suggesting machine learning models based on training data 610 according to one or more embodiments described herein. Repetitive description of like elements employed in other embodiments described herein is omitted for sake of brevity. In an aspect, system 600 can provide suggestions and/or other guidance based on a full or partial set of training data 610 to select a model that can be used in connection with the training data 610. Accordingly, a user of system 600 can leverage an existing set of models and/or model components, prepared by the user and/or others, to obtain useful model information without manual review of large sets of model data. This, in turn, can increase efficiency in experimentation and/or other use of the training data, as existing work can be built upon without creating a new model from scratch.

As shown by FIG. 6, training data 610 is provided to a distance estimator 620, which can compute distances between the provided training data 610 and training data associated with respective models stored in one or more model databases 640. In an aspect, the distance estimator 620 can operate in a similar manner to the distance component 310 as described above. In another aspect, distances computed by the distance estimator 620 can be provided to a model query/search module 630 to facilitate suggestion of one or more models from the model database 640.

Suggestions and/or other guidance provided by the model query/search module 630 can include an identity of suggested models and/or corresponding model components. As an example, the model query/search module 630 can suggested a base model in response to a set of training data 610 in addition to any models that are derived from the base model. Other model parameters, such as configurations and/or neural network definitions, can also be suggested. In an aspect, the model query/search module 630 can also provide computer-executable program code for deploying a suggested module, either by suggesting existing program code or by automatically generating program code based on various suggested model components.

Also or alternatively, the model query/search module 630 can provide supporting evidence and/or information corresponding to respective model suggestions. For instance, the model query/search module 630 can return an estimated degree of similarity between the provided training data 610 and suggested training data, e.g., as a percentage or other metric. Other criteria utilized by the model query/search module 630 in suggesting a given model could also be provided, based on which a user can provide feedback in addition to, or in place of, feedback pertaining to a suggested model itself.

Figure 7:
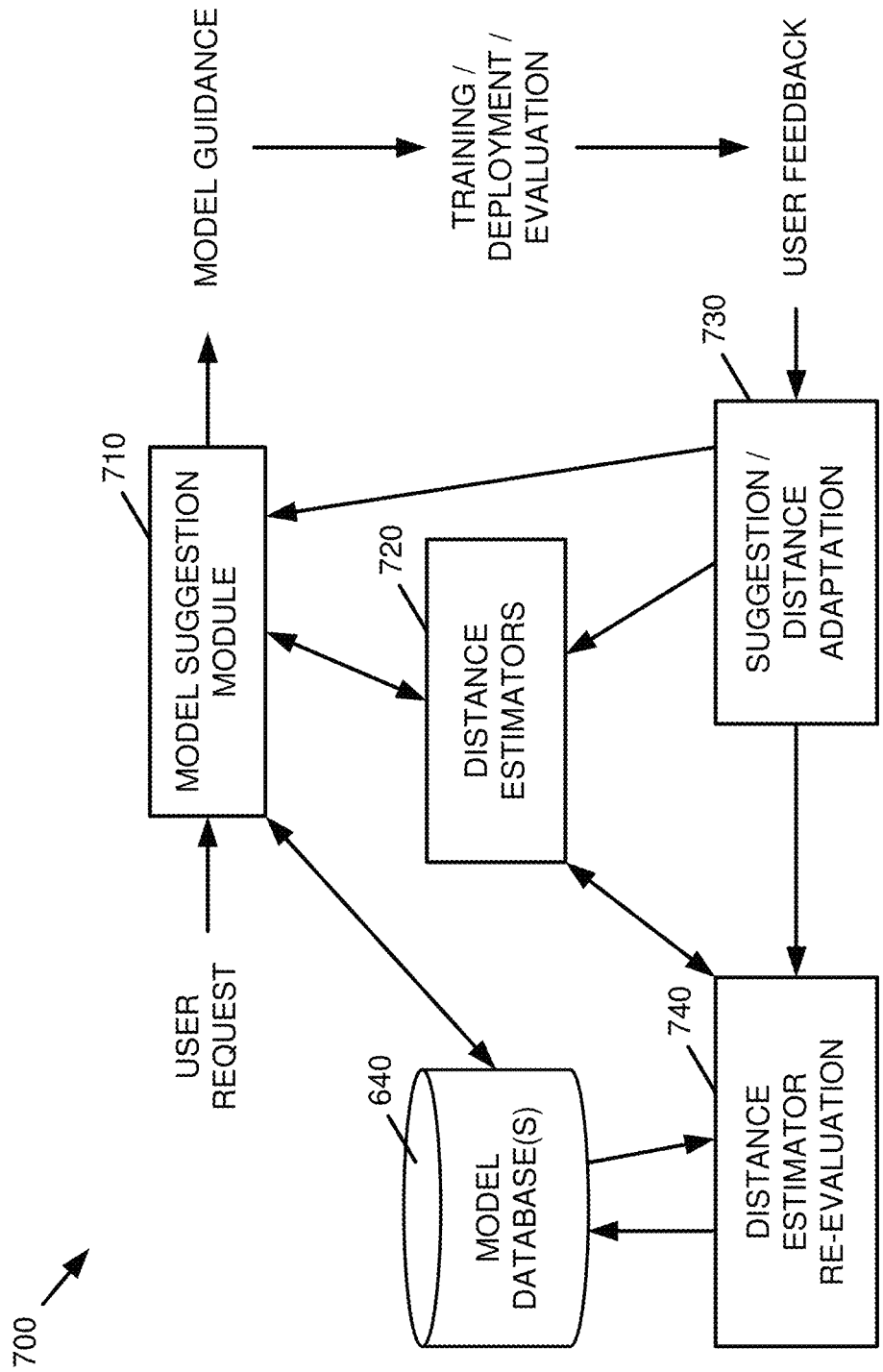
FIG. 7 is a block diagram of a system for suggesting machine learning models in response to a user request according to one or more embodiments described herein.

Turning to FIG. 7, a block diagram of a system 700 for suggesting machine learning models in response to a user request according to one or more embodiments described herein is illustrated. Operation of system 700 can begin by providing a user request to a model suggestion module 710. The user request can include a training data set in a similar manner to that described above with respect to system 600 and/or other model components. In an aspect, a user request can specify a given set of model-related information and include a request for additional information related to the specified information. By way of specific, non-limiting example, a user request can include a request for information (e.g., code, configurations, neural network structures, etc.) relating to models that use a similar training set to a given new training set. As another example, a user request can specify a type of problem to be solved (e.g., stock price prediction, visual object detection/avoidance, etc.) and include a request for base models that can be utilized for that problem type. As a further example, a user request can include a request for information, such as code segments and/or configurations, for running training data through a given neural network configuration. It should be appreciated that the above are merely examples of user requests that could be submitted to the model suggestion module 710 and that other requests are also possible.

In response to providing the request to the model suggestion module 710, a set of distance estimators 720 can compute a distance profile between model components given in the request and model components associated with respective models stored at model database(s) 640. Based on the determined distance profiles, the model suggestion module 710 can suggest one or more models and/or model components in a similar manner to that described above with respect to system 600.

Subsequent to suggesting models and/or model components, a suggested model can be trained and deployed (e.g., by a user making the user request), and the performance of the model on deployment can be evaluated. A user can then provide feedback regarding the suggestion and/or deployment of the model suggested by the model suggestion module 710 to a suggestion/distance adaptation module 730. In an aspect, the suggestion/distance adaptation module can utilize one or more machine learning algorithms for refining and/or adapting the suggested model provided by the model suggestion module 710 and/or the distance profiles determined by the distance estimators 720. If the provided feedback indicates changes to distance profiles associated with one or more models stored at the model database(s) 640, those distance profiles can be updated by a distance estimator re-evaluation module 740 and stored at the corresponding model database(s) 640.

Figure 8:
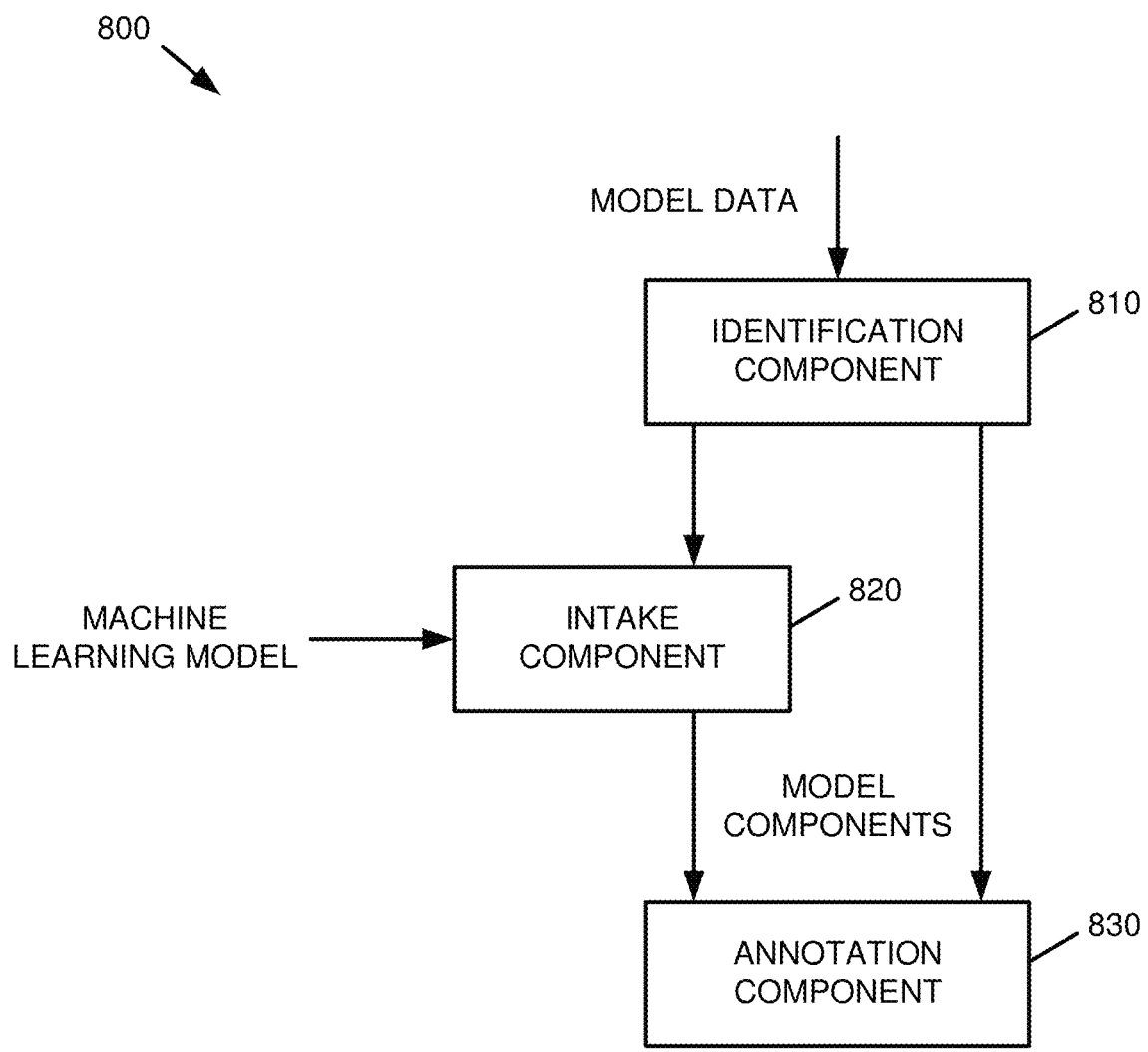
FIG. 8 is a block diagram of a system that facilitates managing machine learning models and related components according to one or more embodiments described herein.

Turning to FIG. 8, a block diagram of a system 800 that facilitates managing machine learning models and related components according to one or more embodiments described herein. Repetitive description of like elements employed in other embodiments described herein is omitted for sake of brevity. As shown in FIG. 8, the system 800 includes an identification component 810 that can identify a set of models, such as a set of models stored in one or more model databases (not shown). The set of models identified by the identification component 810 can include respective model components, such as model configurations, model program code, model training data, model feedback, deployment data, parent model information, etc., in a similar manner to that described above.

The system 800 shown in FIG. 8 further includes an intake component 820 that can identify an incoming machine learning model. In an aspect, the incoming machine learning model can be a new model created and trained from scratch and/or with the guidance of a model suggestion system such as system 100 shown in FIG. 1. The incoming model can be provided by itself, or alternatively the incoming model can be accompanied by other information associated with the model. In an aspect, the incoming model provided to the intake component 820 and/or supporting information provided with the model can include respective model components that are similar to respective model components of the models identified by the identification component 810.

The system 800 additionally includes an annotation component 830 that annotates the incoming machine learning model identified by the intake component 820 with respective pairwise distances between respective ones of the model components of the models identified by the identification component 810 and corresponding ones of the model components of the incoming model. These pairwise distances can subsequently be stored with the incoming model, e.g., in a model database and/or other suitable data structure.

Figure 9:
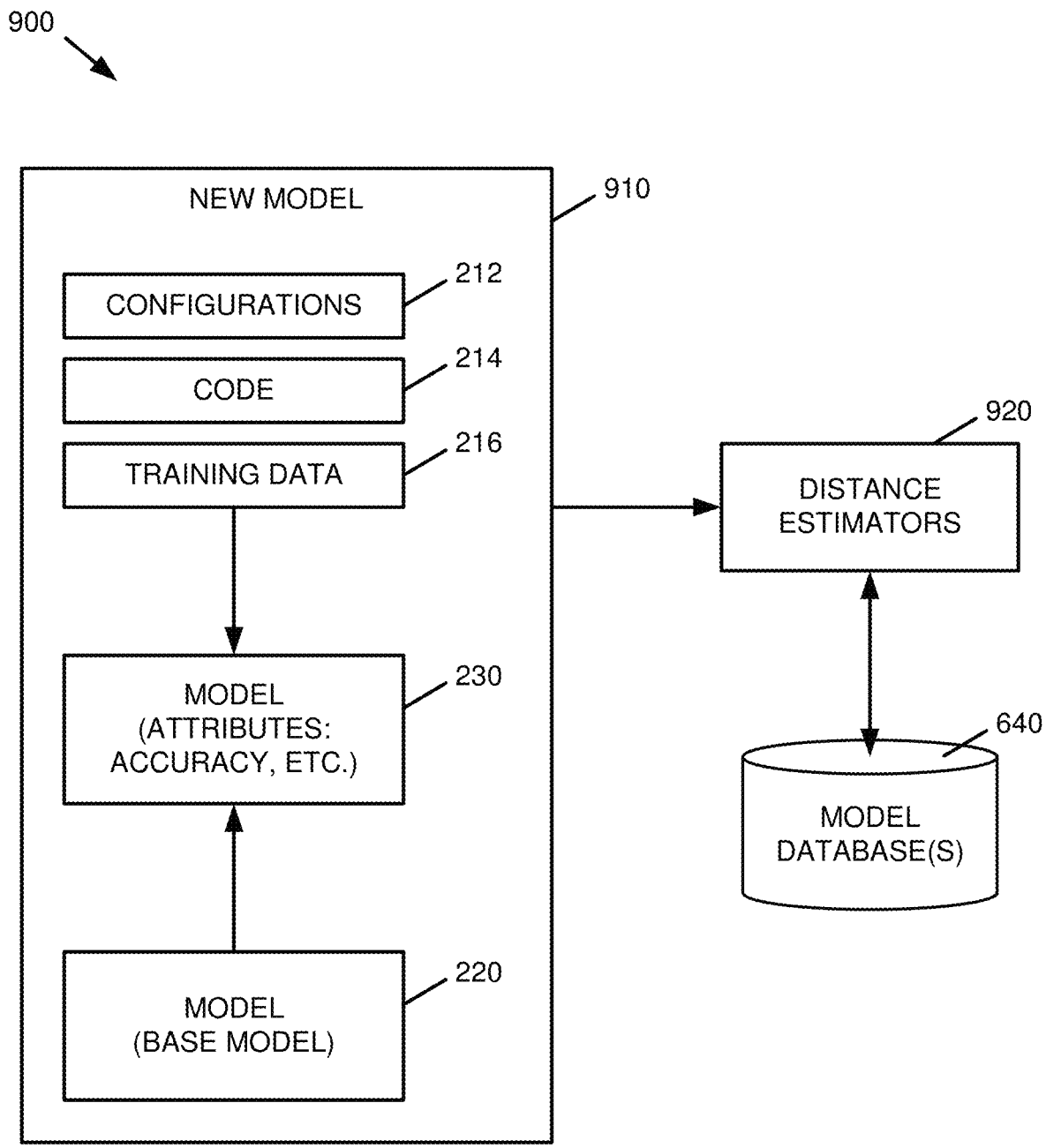
FIG. 9 is a block diagram of a system that facilitates annotating incoming machine learning models according to one or more embodiments described herein.

Diagram 900 in FIG. 9 illustrates example operations performed by the annotation component 830. Here, a new model 910, e.g., a model identified by the intake component 820, is accepted as input. The model 910 can include respective ones of the model components 212-230 as described above with respect to FIG. 2 and/or other suitable components. In an aspect, the model 910 is analyzed by one or more distance estimators 920 to determine pairwise distances between respective model components of the new model 910 and corresponding model components of other models stored in one or more model databases 640. The distances determined by the distance estimators 920, once determined, can be added as annotations to the model 910, and the model 910 can be stored at the model database(s) 640. In an aspect, the distance estimators 920 can include neural networks and/or other machine learning models that can be configured to classify relations between the new model 910 and the models stored in the model database(s) 640. Other implementations are also possible.

Figure 10:
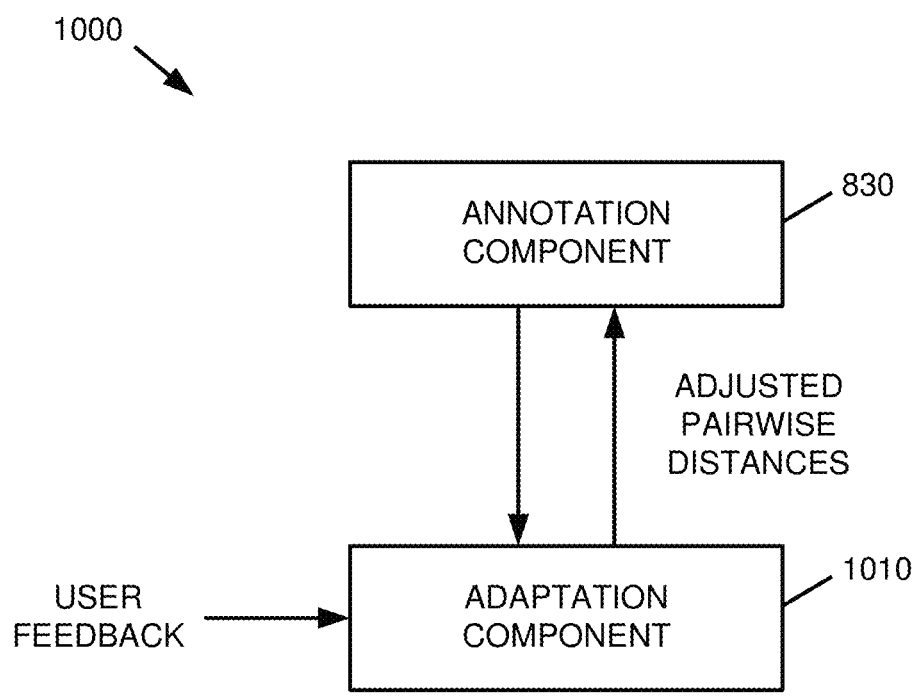
FIG. 10 is a block diagram of a system that facilitates refinement of model annotations according to one or more embodiments described herein.

Turning to FIG. 10, a system 1000 that facilitates refinement of model annotations according to one or more embodiments described herein is illustrated. Repetitive description of like elements employed in other embodiments described herein is omitted for sake of brevity. Here, annotations created by the annotation component 830 are provided to an adaptation component 1010 that can adjust the respective pairwise distances computed by the annotation component 830 based on user feedback. For instance, prior to entry of a new annotated model into an associated database, a user can be provided with the ability to provide feedback regarding the model relations computed by the annotation component 830. If the user feedback indicates that the pairwise distances computed by the annotation component 830 are inaccurate, the adaptation component 1010 can make appropriate adjustments and return adjusted pairwise distances to the annotation component 830. Also or alternatively, the adaptation component 1010 can record the nature of the user feedback, e.g., whether the feedback was positive or negative, to influence future annotations.

Figure 11:
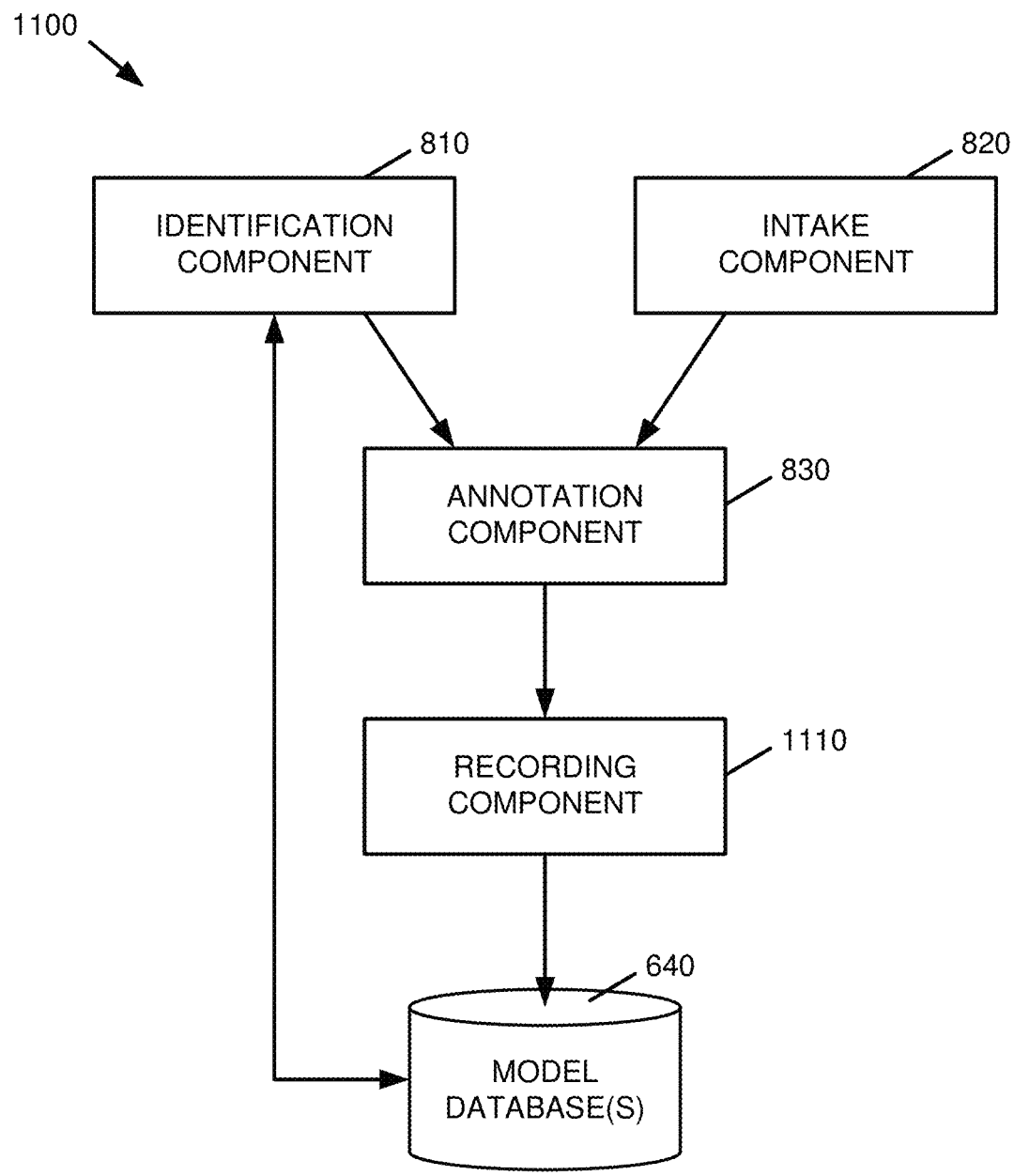
FIG. 11 is a block diagram of a system that facilitates storage of annotated machine learning models according to one or more embodiments described herein.

FIG. 11 illustrates a system 1100 that facilitates storage of annotated machine learning models according to one or more embodiments described herein. Repetitive description of like elements employed in other embodiments described herein is omitted for sake of brevity. As shown by FIG. 11, system 1100 includes a recording component 1110 that can store an incoming machine learning model as identified by the intake component 820 and annotated by the annotation component 830 in a data structure, here one or more model databases 640, that includes the set of models identified by the identification component 810. While not shown in FIG. 11, the recording component 1110 can also store the incoming annotated model in one or more other data structures in addition to, or in place of, the model database(s) 640.

Figure 12:
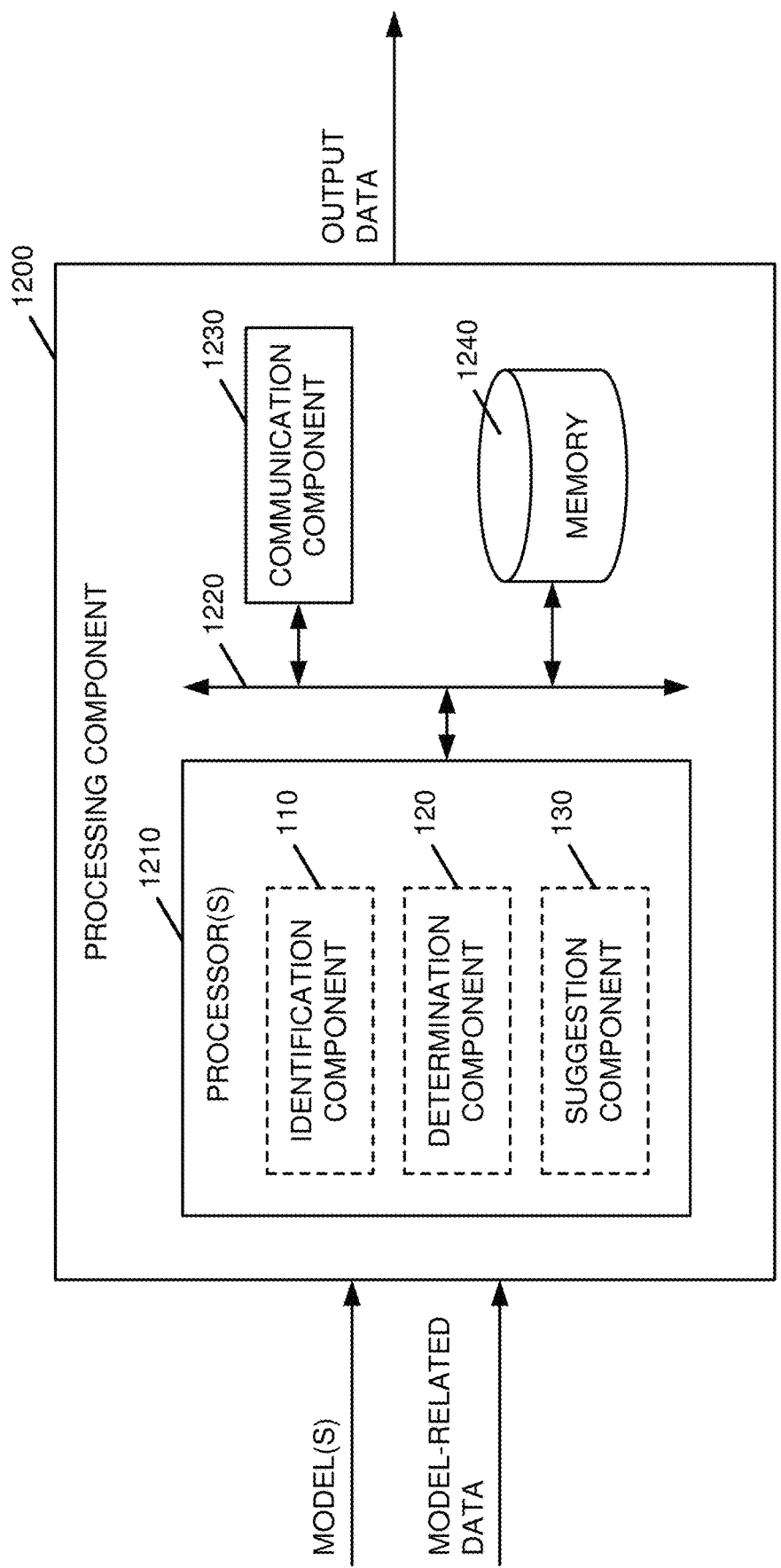
FIGS. 12-13 are block diagrams of respective example, non-limiting processing components according to one or more embodiments described herein.

Referring next to FIG. 12, a processing component 1200 that can be utilized to implement one or more aspects described herein is illustrated in accordance with one or more embodiments. Repetitive description of like elements employed in other embodiments described herein is omitted for sake of brevity.

As shown in FIG. 12, the processing component 1200 can be associated with at least one processor 1210 (e.g., a central processing unit, a graphical processing unit, etc.), which can be utilized to implement one or more of the identification component 110, the determination component 120, or the suggestion component 130 as described above. The processor(s) 1210 can be connected via a data bus 1220 to one or more additional sub-components of the processing component 1200, such as a communication component 1230 and/or a memory 1240. While the communication component 1230 is illustrated as implemented separately from the processor(s) 1210, the processor(s) 1210 in some embodiments can additionally be used to implement the communication component 1230. In still other embodiments, the communication component 1230 can be external to the processing component 1200 and communicate with the processing component 1200 via a separate communication link.

The memory 1240 can be utilized by the processing component 1200 to store data utilized by the processing component 1200 in accordance with one or more embodiments described herein. Additionally or alternatively, the memory 1240 can have stored thereon machine-readable instructions that, when executed by the processing component 1200, cause the processing component (and/or one or more processors 1210 thereof) to implement the identification component 110, the determination component 120, or the suggestion component 130 as described above.

Figure 13:
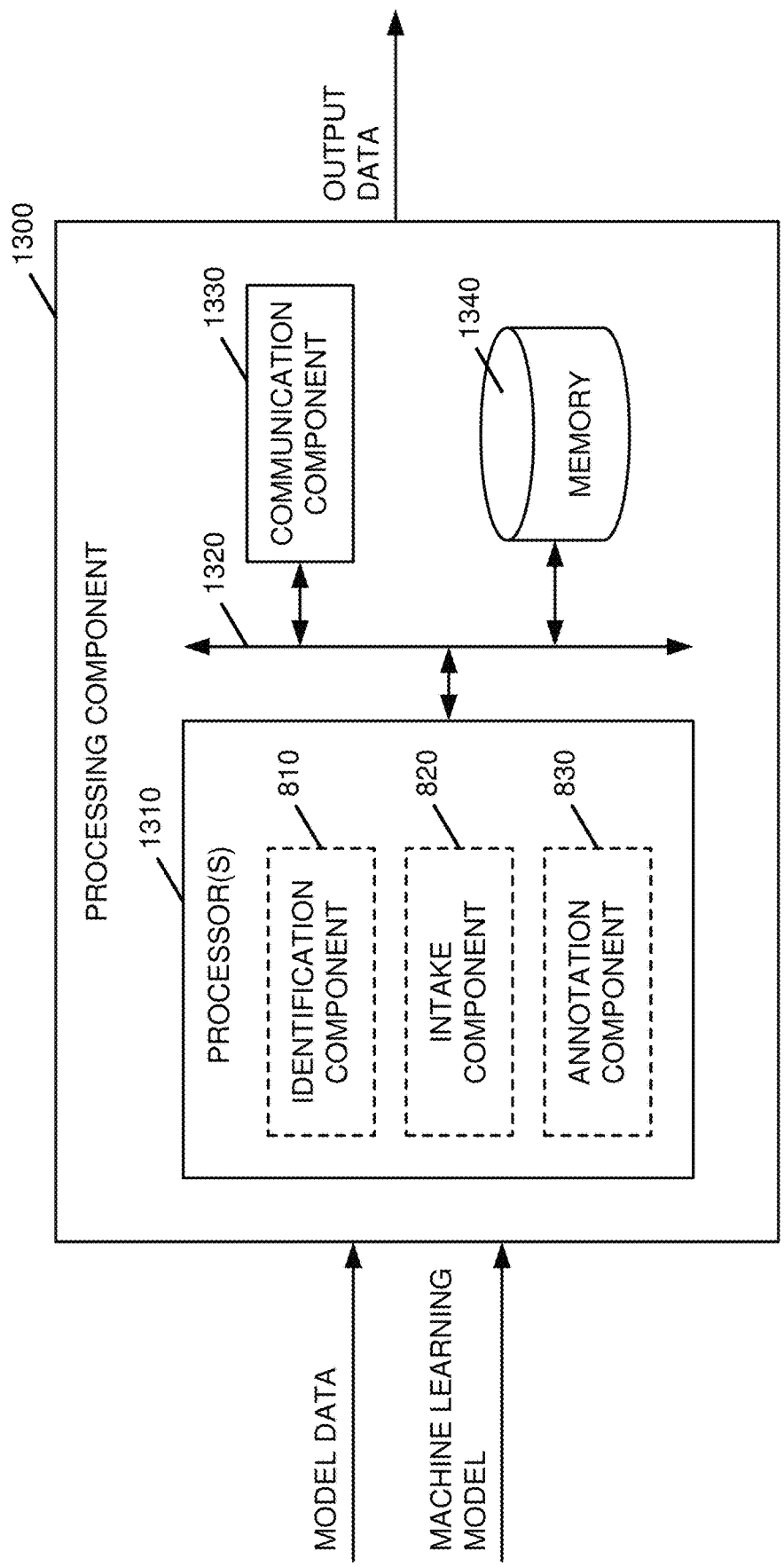

FIG. 13 illustrates another processing component 1300 that can be utilized to implement one or more aspects described herein is illustrated in accordance with one or more embodiments. Repetitive description of like elements employed in other embodiments described herein is omitted for sake of brevity.

As shown in FIG. 13, the processing component 1300 can be associated with at least one processor 1310, which can be utilized to implement one or more of the identification component 810, the intake component 820, and/or the annotation component 830 as described above. The processor(s) 1310 can be connected via a data bus 1320 to one or more additional sub-components of the processing component 1300, such as a communication component 1330 and/or a memory 1340. In an aspect, the communication component 1330 can be configured in similar manners to the communication component 1230 described above with respect to FIG. 12.

Similar to the memory 1240 described above with respect to FIG. 12, the memory 1340 can be utilized by the processing component 1300 to store data utilized by the processing component 1300 in accordance with one or more embodiments described herein. Additionally or alternatively, the memory 1340 can have stored thereon machine-readable instructions that, when executed by the processing component 1300, cause the processing component (and/or one or more processors 1310 thereof) to implement the identification component 810, the intake component 820, and/or the annotation component 830 as described above.

In various embodiments, the processing components 1200, 1300 shown in FIGS. 12-13 can be or include hardware, software (e.g., a set of threads, a set of processes, software in execution, etc.) or a combination of hardware and software that performs a computing task (e.g., a computing task associated with received data). For example, processing components 1200, 1300 can execute data analysis and/or other operations that cannot be performed by a human (e.g., are greater than the capability of a human mind). For example, the amount of data processed, the speed of processing of the data and/or the data types processed by processing components 1200, 1300 over a certain period of time can be respectively greater, faster and different than the amount, speed and data type that can be processed by a single human mind over the same period of time. For example, data processed by processing components 1200, 1300 can be raw data (e.g., raw textual data, raw numerical data, etc.) and/or compressed data (e.g., compressed textual data, compressed numerical data, etc.) associated with one or more computing devices. Moreover, processing components 1200, 1300 can be fully operational towards performing one or more other functions (e.g., fully powered on, fully executed, etc.) while also processing the above-referenced data.

Figure 14:
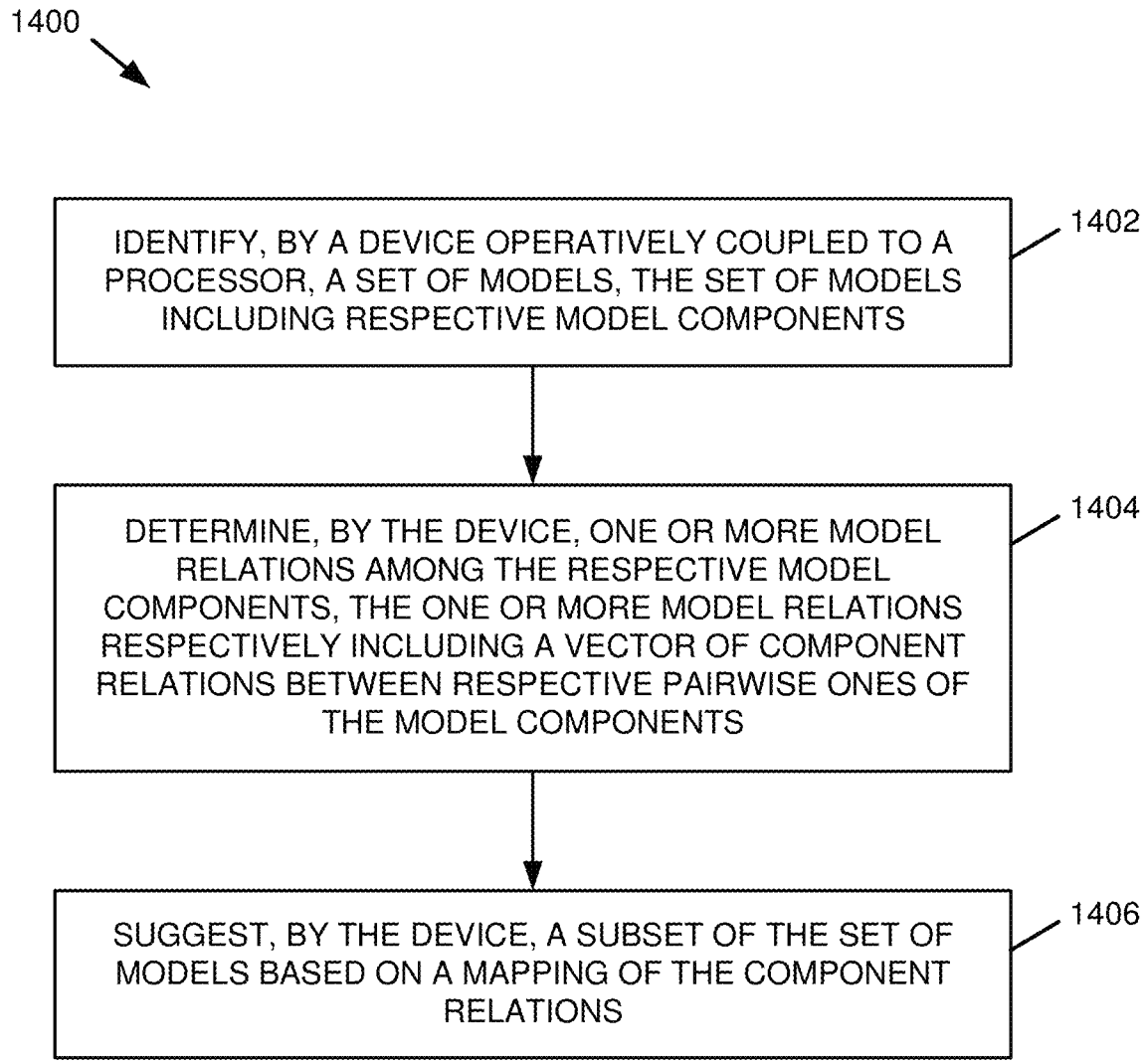
FIG. 14 is a flow diagram of an example, non-limiting computer-implemented method that facilitates guiding machine learning models and related components according to one or more embodiments described herein.

FIG. 14 illustrates a flow diagram of an example, non-limiting computer-implemented method 1400 that facilitates guiding machine learning models and related components according to one or more embodiments described herein. Repetitive description of like elements employed in other embodiments described herein is omitted for sake of brevity.

At 1402, a device operatively coupled to a processor can identify (e.g., by an identification component 110) a set of models, which can include respective model components.

At 1404, the device can determine (e.g., by the determination component 120) one or more model relations among the respective model components. The one or more model relations can respectively include a vector of component relations between respective pairwise ones of the model components.

At 1406, the device can suggest (e.g., by a suggestion component 130) a subset of the set of models identified at 1402 based on a mapping of the component relations determined at 1404.

Figure 15:
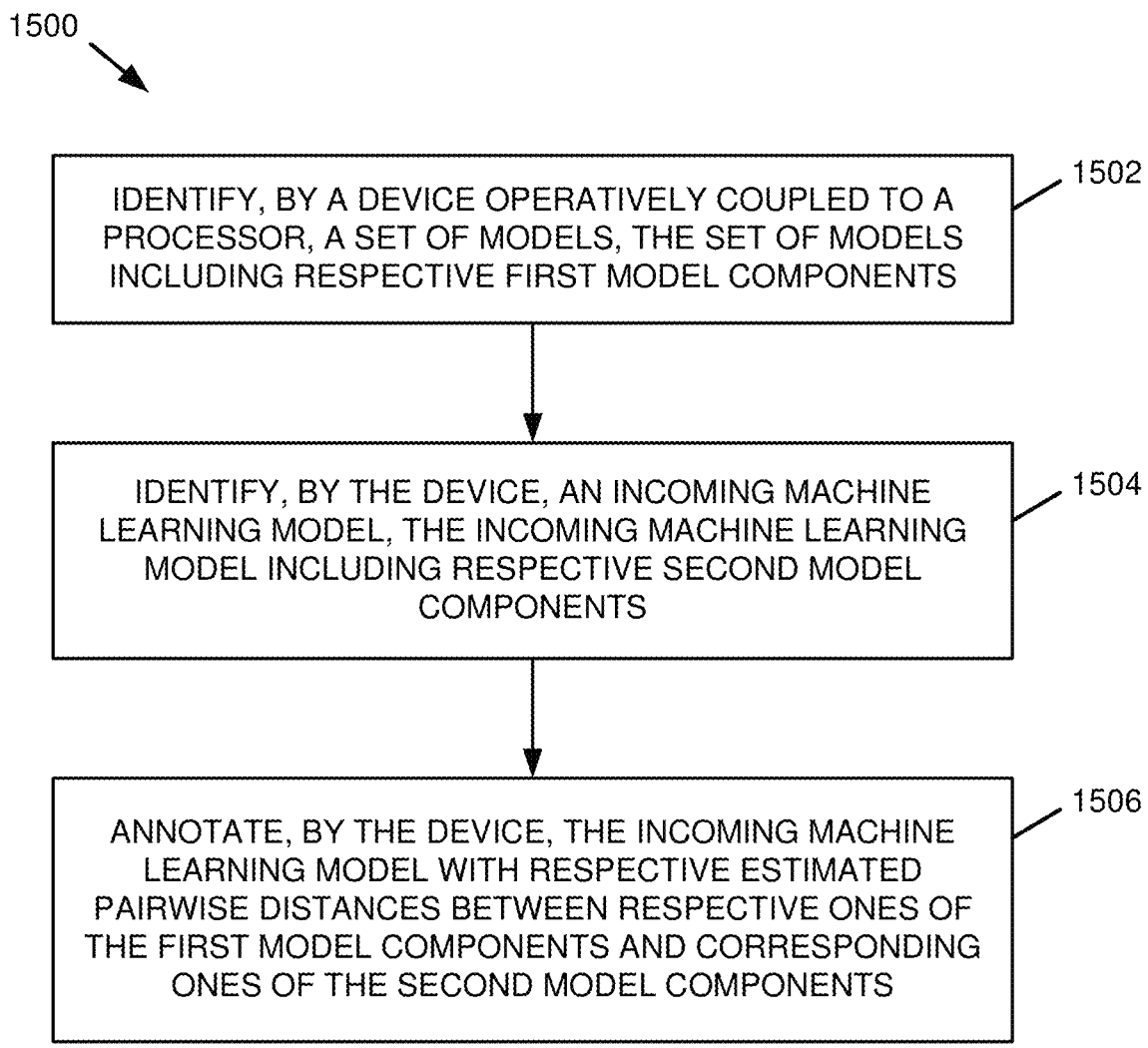
FIG. 15 is a flow diagram of an alternative example, non-limiting computer-implemented method that facilitates managing machine learning models according to one or more embodiments described herein.

FIG. 15 illustrates a flow diagram of an alternative example, non-limiting computer-implemented method 1500 that facilitates managing machine learning models according to one or more embodiments described herein. Repetitive description of like elements employed in other embodiments described herein is omitted for sake of brevity.

At 1502, a device operatively coupled to a processor can identify (e.g., by an identification component 810) a set of models, which can include respective first model components.

At 1504, the device can identify (e.g., by an intake component 820) an incoming machine learning model that includes respective second model components.

At 1506, the device can annotate (e.g., by an annotation component 830) the incoming machine learning model identified at 1504 with respective estimated pairwise distances between respective ones of the first model components as identified at 1504 and corresponding ones of the second model components as identified at 1506.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies can alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components and/or an assignment component is established from a combination of electrical and mechanical components and circuitry, a human is unable to replicate or perform the subject data packet configuration and/or the subject communication between processing components and/or an assignment component. For example, a human is unable to generate data for transmission over a wired network and/or a wireless network between processing components and/or an assignment component, etc. Moreover, a human is unable to packetize data that can include a sequence of bits corresponding to information generated during a spatial computing process, transmit data that can include a sequence of bits corresponding to information generated during a spatial computing process, etc.

Figure 16:
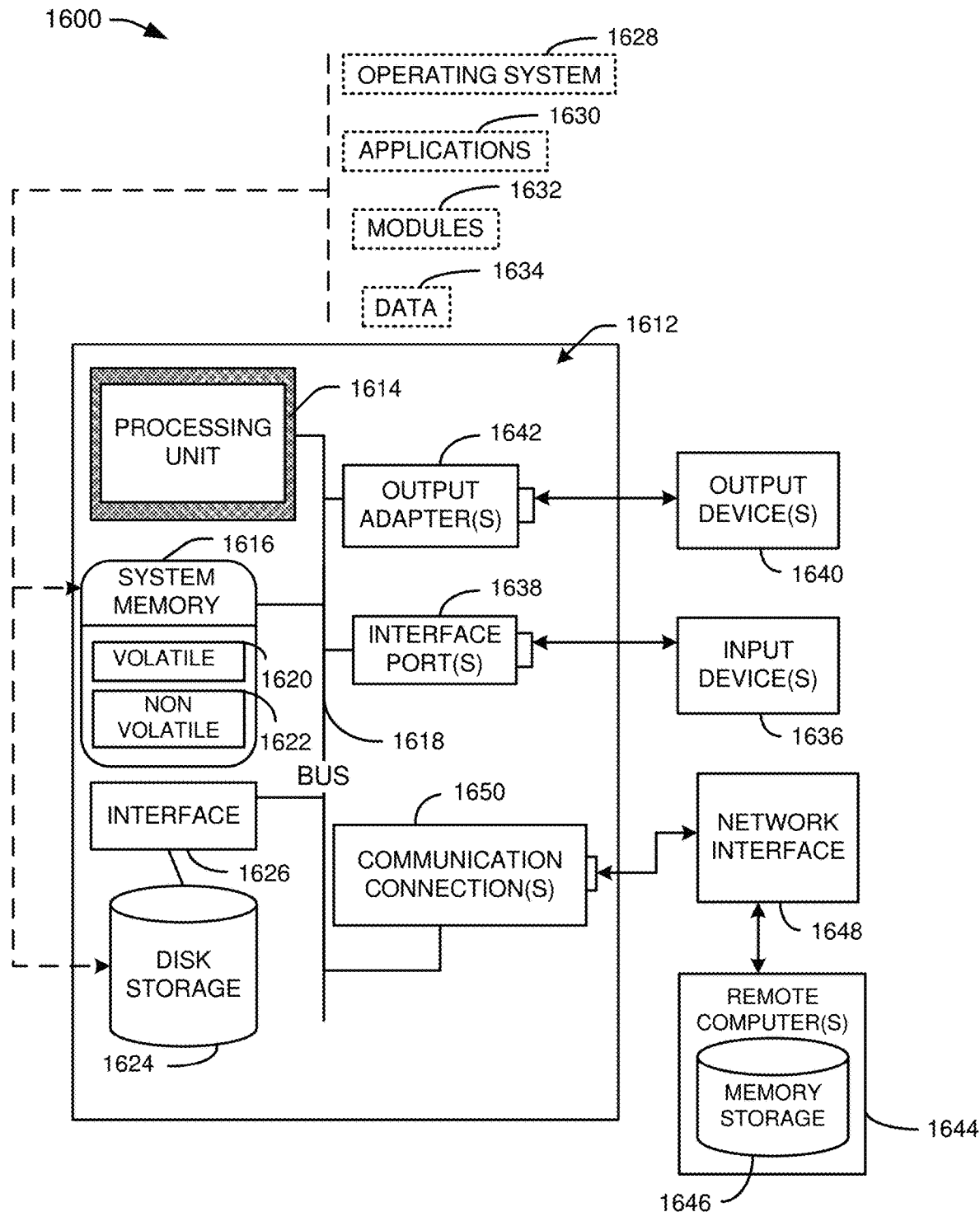
FIG. 16 is a block diagram of an example, non-limiting operating environment in which one or more embodiments described herein can be implemented.

In order to provide a context for the various aspects of the disclosed subject matter, FIG. 16 as well as the following discussion are intended to provide a general description of a suitable environment in which the various aspects of the disclosed subject matter can be implemented. FIG. 16 illustrates a block diagram of an example, non-limiting operating environment in which one or more embodiments described herein can be facilitated. Repetitive description of like elements employed in other embodiments described herein is omitted for sake of brevity. With reference to FIG. 16, a suitable operating environment 1600 for implementing various aspects of this disclosure can also include a computer 1612. The computer 1612 can also include a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614. The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1616 can also include volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1620 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1612 can also include removable/non-removable, volatile/nonvolatile computer storage media. FIG. 16 illustrates, for example, a disk storage 1624. Disk storage 1624 can also include, but is not limited to, devices like a magnetic disk drive, solid state drive, floppy disk drive, tape drive, Jaz drive, Zip drive, LS-100 drive, flash memory card, or memory stick. The disk storage 1624 also can include storage media separately or in combination with other storage media including, but not limited to, an optical disk drive such as a compact disk ROM device (CD-ROM), CD recordable drive (CD-R Drive), CD rewritable drive (CD-RW Drive), a digital versatile disk ROM drive (DVD-ROM), or a Blu-ray disc drive. To facilitate connection of the disk storage 1624 to the system bus 1618, a removable or non-removable interface is typically used, such as interface 1626. FIG. 16 also depicts software that acts as an intermediary between users and the basic computer resources described in the suitable operating environment 1600. Such software can also include, for example, an operating system 1628. Operating system 1628, which can be stored on disk storage 1624, acts to control and allocate resources of the computer 1612. System applications 1630 take advantage of the management of resources by operating system 1628 through program modules 1632 and program data 1634, e.g., stored either in system memory 1616 or on disk storage 1624. It is to be appreciated that this disclosure can be implemented with various operating systems or combinations of operating systems. A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port can be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a computer, a server, a router, a network PC, a workstation, a microprocessor based appliance, a peer device or other common network node and the like, and typically can also include many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1650 refers to the hardware/software employed to connect the network interface 1648 to the system bus 1616. While communication connection 1650 is shown for illustrative clarity inside computer 1612, it can also be external to computer 1612. The hardware/software for connection to the network interface 1648 can also include, for exemplary purposes only, internal and external technologies such as, modems including regular telephone grade modems, cable modems and DSL modems, ISDN adapters, and Ethernet cards.

Various embodiments of the present can be a system, a method, an apparatus and/or a computer program product at any possible technical detail level of integration. The computer program product can include a computer readable storage medium (or media) having computer readable program instructions thereon for causing a processor to carry out one or more aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform one or more aspects of the present invention.

One or more aspects of the present invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Various modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components; and
   a processor that executes the computer executable components stored in the memory, wherein the computer executable components comprise:
   a suggestion component that receives a user query for suggested models, wherein the user query comprises model-related data;
   an identification component that identifies models, wherein the models respectively comprise model components;
   a learning component trains a cognitive exploration system comprising a neural network to determine model relations among the model components and the model-related data;
   a determination component that determines, using the cognitive exploration system comprising the neural network, the model relations among the model components and the model-related data, wherein the model relations comprise vectors of component relations between respective pairwise ones of the model components and the model-related data; and
   the suggestion component responds to the user query with the suggested models comprising a subset of the models selected, using the cognitive exploration system comprising the neural network, based on the vectors of component relations, wherein the subset of the models are selected to be most dissimilar to the model-related data according to a tolerance parameter indicative of degree of similarity.

2. The system of claim 1, wherein the computer executable components further comprise:
   a distance component that computes distances between the pairwise ones of the model components and the model-related data.

3. The system of claim 2, wherein the subset of the models are selected based further on the distances as represented in the vectors of component relations.

4. The system of claim 3, wherein the subset of the models are selected based further on a comparison of the distances to the tolerance parameter.

5. The system of claim 1, wherein the subset of the models are selected to be similar to the model-related data according to another tolerance parameter indicative of degree of similarity with respect to a first criterion, and are selected to be most dissimilar to the model-related data according to the tolerance parameter indicative of degree of similarity with respect to a second criterion.

6. The system of claim 1, wherein the model components comprise at least one of model configurations, model program code, model training data, model feedback, deployment data, or parent model information.

7. A computer-implemented method comprising:
   receiving, by a device operatively coupled to a processor, a user query for suggested models, wherein the user query comprises model-related data;
   identifying, by the device, models, wherein the models respectively comprise model components;
   training, by the device, a cognitive exploration system comprising a neural network to determine model relations among the model components and the model-related data;
   determining, by the device, using the cognitive exploration system comprising the neural network, the model relations among the model components and the model-related data, wherein the model relations comprise respective vectors of component relations between respective pairwise ones of the model components and the model-related data; and
   responding, by the device, to the user query with the suggested models comprising a subset of the models selected, using the cognitive exploration system comprising the neural network, based on the vectors of component relations, wherein the subset of the models are selected to have a high dissimilarity to the model-related data according to a tolerance parameter indicative of degree of similarity.

8. The computer-implemented method of claim 7, wherein the subset of the models are selected to have a high similarity to the model-related data according to another tolerance parameter indicative of degree of similarity with respect to a first criterion, and are selected to have the high dissimilarity to the model-related data according to the tolerance parameter indicative of degree of similarity with respect to a second criterion.

9. The computer-implemented method of claim 7, further comprising:
   computing, by the device, distances between the pairwise ones of the model components and the model-related data.

10. The computer-implemented method of claim 9, further comprising selecting, by the device, using the cognitive exploration system comprising the neural network, the subset of the models based on the distances as represented in the vectors of component relations.

11. The computer-implemented method of claim 10, wherein the selecting is further based on a comparison of the distances to the tolerance parameter.

12. The computer-implemented method of claim 7, wherein the model components comprise at least one of model configurations, model program code, model training data, model feedback, deployment data, or parent model information.

13. A computer program product for providing guidance in machine learning models, the computer program product comprising a computer readable storage medium having program instructions embodied therewith, the program instructions executable by a processor to cause the processor to:
   receive a user query for suggested models, wherein the user query comprises model-related data;

identify models, wherein the models respectively comprise model components;

train a cognitive exploration system comprising a neural network to determine model relations among the model components and the model-related data;

determine, using the cognitive exploration system comprising the neural network, the model relations among the model components and the model-related data, wherein the model relations comprise respective vectors of component relations between respective pairwise ones of the model components and the model-related data; and respond to the user query with the suggested models comprising a subset of the models selected, using the cognitive exploration system comprising the neural network, based on the vectors of component relations, wherein the subset of the models are selected to be of greater dissimilarity to the model-related data according to a tolerance parameter indicative of degree of similarity.

14. The computer program product of claim 13, wherein the subset of the models are selected to be of greater similarity to the model-related data according to another tolerance parameter indicative of degree of similarity with respect to a first criterion, and are selected to be of the greater dissimilarity to the model-related data according to the tolerance parameter indicative of degree of similarity with respect to a second criterion.

15. The computer program product of claim 13, wherein the program instructions further cause the processor to:
compute distances between the pairwise ones of the model components and the model-related data.

16. The computer program product of claim 15, wherein the program instructions further cause the processor to:
select, using the cognitive exploration system comprising the neural network, the subset of the models based on the distances as represented in the vectors of component relations.

17. The computer program product of claim 13, wherein the model components comprise at least one of model configurations, model program code, model training data, model feedback, deployment data, or parent model information.

18. A system comprising:
a memory that stores computer executable components; and
a processor that executes the computer executable components stored in the memory, wherein the computer executable components comprise:
a suggestion component that receives a user request for suggested models, wherein the user request comprises model-related data, and the model-related data comprises a training data set and specifies a type of problem to be solved;
an identification component that identifies models, wherein the models respectively comprise model components;
a learning component trains a neural network to determine model relations among the model components and the model-related data;
a determination component that determines, using the neural network, the model relations among the model components and the model-related data, wherein the model relations comprise vectors of component relations between respective pairwise ones of the model components and the model-related data; and
the suggestion component responds to the user request with the suggested models comprising a subset of the models that have been previously employed for the type of problem to be solved and are selected, using the neural network, based on the vectors of component relations, wherein the subset of the models are selected to be most dissimilar to the model-related data according to a tolerance parameter indicative of degree of similarity.

19. The system of claim 18, wherein the computer executable components further comprise:
a distance component that computes distances between the pairwise ones of the model components and the model-related data.

20. The system of claim 19, wherein the subset of the models are selected based further on the distances as represented in the vectors of component relations.

21. The system of claim 20, wherein the subset of the models are selected based further on a comparison of the distances to the tolerance parameter.

22. A computer-implemented method comprising:
receiving, by a device operatively coupled to a processor, a user request for suggested models, wherein the user request comprises model-related data, and the model-related data comprises a training data set and specifies a type of problem to be solved;
identifying, by the device, models, wherein the models respectively comprise model components;
training, by the device, a neural network to determine model relations among the model components and the model-related data;
determining, by the device, using the neural network, the model relations among the model components and the model-related data, wherein the model relations comprise respective vectors of component relations between respective pairwise ones of the model components and the model-related data; and
responding, by the device, to the user request with the suggested models comprising a subset of the models that have been previously employed for the type of problem to be solved and are selected, using the neural network, based on the vectors of component relations, wherein the subset of the models are selected to have a high dissimilarity to the model-related data according to a tolerance parameter indicative of degree of similarity.

23. The computer-implemented method of claim 22, further comprising:
computing, by the device, distances between the pairwise ones of the model components and the model-related data.

24. The computer-implemented method of claim 23, further comprising selecting, by the device, using the neural network, the subset of the models based on the distances as represented in the vectors of component relations.

25. The computer-implemented method of claim 24, wherein the selecting is further based on a comparison of the distances to the tolerance parameter.

* * * * *